US007249667B2

(12) United States Patent
Sansevero et al.

(10) Patent No.: US 7,249,667 B2
(45) Date of Patent: Jul. 31, 2007

(54) TRAFFIC FLOW INDICATOR FOR A PASSENGER CONVEYOR

(75) Inventors: Frank Sansevero, Glastonbury, CT (US); Carla Majuntke, Bristol, CT (US); Ralph Stripling, Berlin (DE); Bernward Engelke, Hildesheim (DE); Thomas Swyst, Arlington, MA (US); Alexander Mueller, Nuremberg (DE)

(73) Assignee: Otis Elevator Company, Farmington, CT (US)

( * ) Notice: Subject to any disclaimer, the term of this patent is extended or adjusted under 35 U.S.C. 154(b) by 0 days.

(21) Appl. No.: 10/550,980

(22) PCT Filed: Apr. 4, 2003

(86) PCT No.: PCT/US03/10363

§ 371 (c)(1),
(2), (4) Date: Sep. 26, 2005

(87) PCT Pub. No.: WO2004/099040

PCT Pub. Date: Nov. 18, 2004

(65) Prior Publication Data

US 2006/0219520 A1 Oct. 5, 2006

(51) Int. Cl.

| | |
|---|---|
| ***B65G 15/00*** | (2006.01) |
| ***B65G 17/00*** | (2006.01) |
| ***B65G 47/66*** | (2006.01) |
| ***B65G 43/00*** | (2006.01) |
| ***B66B 29/08*** | (2006.01) |
| ***B66B 23/22*** | (2006.01) |
| ***B66B 23/24*** | (2006.01) |

(52) U.S. Cl. ...................... 198/324; 198/335; 198/337; 198/810.02

(58) Field of Classification Search ................ 198/321, 198/324, 335, 337, 502.1, 810.02
See application file for complete search history.

(56) References Cited

U.S. PATENT DOCUMENTS

| | | | | |
|---|---|---|---|---|
| 4,798,274 | A * | 1/1989 | Saito | 198/324 |
| 5,040,659 | A * | 8/1991 | Saito et al. | 198/324 |
| 5,431,271 | A * | 7/1995 | Abraham et al. | 198/324 |
| 5,511,647 | A * | 4/1996 | Adrian et al. | 198/335 |
| 5,782,330 | A | 7/1998 | Mehlert et al. | |
| 5,923,005 | A | 7/1999 | Blondiau et al. | |
| 6,564,921 | B1 | 5/2003 | Gorczycz | |

OTHER PUBLICATIONS

PCT International Search Report for PCT/US03/10363 mailed Aug. 8, 2003.

* cited by examiner

*Primary Examiner*—Gene O. Crawford
*Assistant Examiner*—Ramya G. Prakasam
(74) *Attorney, Agent, or Firm*—Carlson, Gaskey & Olds

(57) ABSTRACT

A display device (40) for use with a passenger conveyor (20) provides traffic flow direction information. One example includes a display panel (42) supported on a surface (38) that is conveniently positioned beneath the handrail (28) near a landing (24). In a particular example, a handrail entry module (32) includes a handrail entry (36) and a support surface (38) that supports the display (40). In one example, the surface (38) extends down and out from a vertical surface (34) associated with the handrail entry (36) to maximize visibility of the display.

20 Claims, 1 Drawing Sheet

TRAFFIC FLOW INDICATOR FOR A PASSENGER CONVEYOR

FIELD OF THE INVENTION

This invention generally relates to displays for passenger conveyors. More particularly, this invention relates to a traffic flow indicator display for a passenger conveyor.

DESCRIPTION OF THE RELATED ART

Passenger conveyors, such as escalators and moving walkways, typically include a plurality of steps that move along a selected path between landings. In the case of escalators, the steps move in an upward or downward direction to carry passengers between different levels within a building, for example.

It has been desirable to provide a visible indication of the direction of movement of a passenger conveyor to approaching passengers. One approach has been to include visible markings on the outer decking beneath the balustrade associate with the handrail. This approach has been used where the balustrades are not clear. Another approach has been to include the visible marking on the outside of a glass balustrade. A shortcoming to either of these approaches is that they are visible only to passengers approaching the escalator from a straight-on direction. Such indicators may be visible at other particular angles but only from limited vantage points.

Another type of indicator provided previously was to include a post or sign external to the escalator indicating a direction of traffic flow. A shortcoming of such signs is that they are not on any portion of the escalator system and can prove inconvenient to business owners, for example, who are trying to maximize their use of floor space.

There is a need for an improved display to provide individuals a visible indication of the direction of traffic flow of a passenger conveyor, such as an escalator. This invention addresses that need while avoiding the shortcomings and drawbacks of prior approaches.

SUMMARY OF THE INVENTION

In general terms, this invention is a display that provides traffic flow information indicating a direction of movement of a passenger conveyor.

One example device for indicating the direction of movement of a passenger conveyor, designed according to this invention, includes a display that is adapted to be placed beneath a handrail near a landing at one end of the conveyor. The display is visible to an individual approaching the end of the conveyor.

In one example, the display is supported on a handrail entry module that includes at least one surface that is at least partially at an oblique angle relative to the landing. The display is supported on the obliquely oriented surface to maximize the visibility of the display to a wider variety of approaching passengers.

One example arrangement includes a controller that controls the contents of the display automatically to correspond to a direction of movement of the conveyor. In one example the controller uses information regarding a direction of movement of a motor that is associated with the passenger conveyor to propel the steps in a desired direction.

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figures 1, 2:
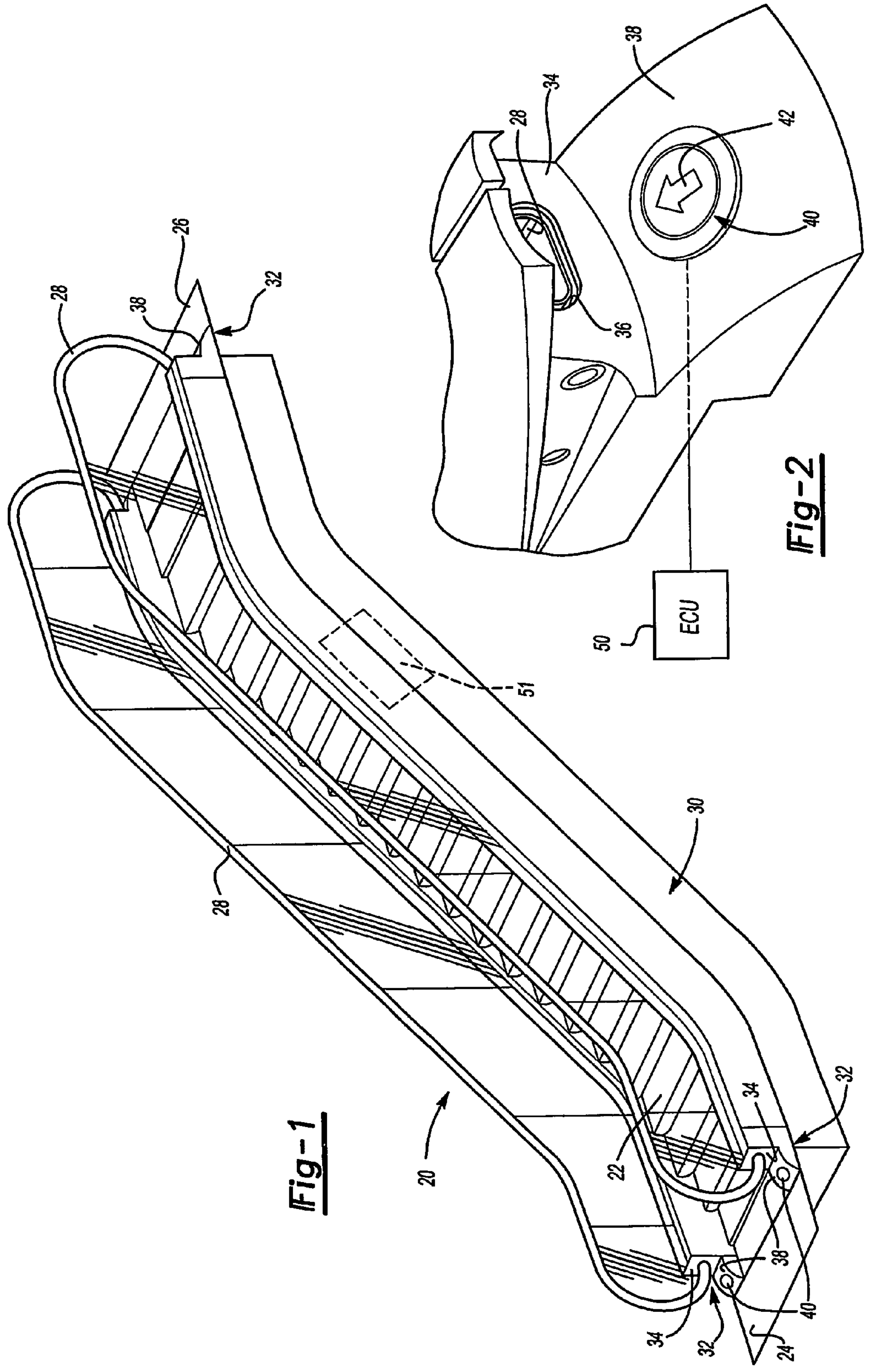
FIG. 1 schematically illustrates a passenger conveyor system incorporating a display designed according to an embodiment of this invention.
FIG. 2 diagrammatically illustrates an example display arrangement designed according to an embodiment of this invention.

As shown in FIG. 1, a passenger conveyor 20 includes a plurality of steps 22 that move in a selected direction between landings 24 and 26. The illustrated conveyor is as escalator, however, this invention is not limited only to escalators. Moving walkways and other types of passenger conveyors are within the scope of this invention.

The steps 22 move in a conventional manner to carry passengers between the landings 24 and 26, which are at opposite ends of the escalator. A handrail 28 moves in a conventional fashion with the steps 22 to provide a handle to stabilize passengers on the escalator. A conventional escalator support structure 30 at least partially covers over some of the operating components of the escalator system in a conventional manner.

Handrail entry modules 32 are positioned on opposite sides of the steps at each landing. In this example, each module 32 includes a generally vertical surface 34 having an opening 36, which provides the handrail entry. A support surface 38 extends generally down and out from the vertical surface 34 between the corresponding landing and the vertical surface. In the illustrated example, the surface 38 is at least partially arranged at an oblique angle relative to the landing. In the particular examples of FIGS. 2 and 3, the surface 38 is rounded or at least partially curvilinear. The position angles and shapes of the surfaces 34 and 36 can be varied to meet the needs of a particular situation. Given this description, those skilled in the art will be able to select what provides them an intended result.

A display 40 is supported by the module 32 and in this example is generally aligned with the support surface 38. The display 40 provides a visible indication of the direction of traffic flow of the escalator. A variety of indicators may be provided on the display 40, depending on the selection of equipment to provide the display. One example indicator is an arrow pointing in the direction of traffic flow. Another example indicator is the word "UP" or the word "DOWN" indicating a direction of escalator traffic flow. Other example indicators useful with a display designed according to this invention include a stop sign, a symbol indicating "no entry," a symbol indicating that an individual is entering a one-way street in the wrong direction or an "X" indicating that an escalator is not properly working and the steps are not moving. Those skilled in the art who have the benefit of this description will be able to select the appropriate display contents to meet the needs of their particular situation.

Referring to FIG. 2, a display panel 42 provides the visible indication of the traffic flow direction. In one example, the display panel 42 includes lights that are selectively powered to provide the desired traffic flow indication. LED's are used in one example. Another example includes a liquid crystal display panel. A variety of commercially available displays can be incorporated into a device designed according to this invention. Given this description, those skilled in the art will be able to select appropriate components to meet the needs of their particular situation.

Although the illustrated example includes the display 40 as part of the handrail entry module 32, this invention is not necessarily limited to such an integrated arrangement. Other embodiments that place the display beneath the handrail near a landing are within the scope of this invention. In one example, the display is supported by a structural member that is part of the landing.

As schematically shown in FIG. 2, an electronic control unit 50 controls the display 40. In one example, a dedicated microprocessor is provided to control the contents of the display 40. In another example, the controller 50 is part of a controller associated with the machine (i.e., motor and brake schematically shown at 51 in FIG. 1) that is responsible for controlling the movement or operation of the escalator. The controller 50 sends appropriate signals to the display 40 so that the desired display is provided. The controller 50, for example, provides an indication of the traffic flow direction based upon information determined regarding movement of the motor.

One advantage of this invention is that it places the traffic flow indicator display 40 near the handrail entry point 36. Providing a display of traffic flow information beneath the handrail at the landing makes the indicator more readily visible to a wider variety of potential passengers. Such a display is more readily visible from a variety of angles and more readily interpreted as providing a direct indication of the direction of flow or movement of the steps 22. This invention allows for integrating a traffic flow display into an elevator system in a manner that is aesthetically pleasing and provides higher functionality than previous attempts.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A device for indicating a direction of movement of a passenger conveyor, comprising:

a handrail entry module having an opening through which a passenger conveyor handrail passes and a support surface having one end beneath the opening and a second end that is configured to be positioned adjacent a landing surface at one end of an associated conveyor; and a display on the support surface beneath the opening such that the display is visible to an individual approaching the end of the conveyor.

2. The device of claim 1, wherein the display includes a display screen that is at least partially at an oblique angle relative to the landing when the display is placed beneath the handrail.

3. The device of claim 1, wherein the display comprises an electronic display panel.

4. The device of claim 3, wherein the display is lighted.

5. The device of claim 3, wherein the display comprises a liquid crystal display panel.

6. The device of claim 1, including a controller that controls an indicator on the display and wherein the controller automatically sets the indicator to correspond to a direction of movement of the conveyor.

7. The device of claim 6, wherein the controller uses information regarding a direction of movement of a motor of the conveyor to determine the corresponding indicator.

8. The device of claim 1, wherein the support surface is curved.

9. A passenger conveyor, comprising:

a plurality of steps that move along a selected path between two landings;

a handrail that moves with the steps;

a handrail entry module that includes an opening through which the handrail passes and at least one support surface positioned beneath the handrail between the opening and a corresponding one of the landings; and a display on the support surface between the opening and the landing such that the display is visible to an individual approaching the landing, the display providing an indication of a direction of movement of the steps.

10. The passenger conveyor of claim 9, including a handrail on each side of the steps and a display beneath each handrail near each landing.

11. The passenger conveyor of claim 9, wherein the support surface is at least partially at an oblique angle relative to the landing.

12. The passenger conveyor of claim 9, wherein the handrail entry module includes a generally vertical portion and wherein the support surface extends generally down and away from the vertical portion.

13. The passenger conveyor of claim 9, wherein the support surface is curved.

14. The passenger conveyor of claim 9, wherein the display comprises an electrically powered indicator.

15. The passenger conveyor of claim 14, wherein the display is selectively at least partially lit to provide the indication of the direction of step movement.

16. The passenger conveyor of claim 14, wherein the display comprises a liquid crystal display panel.

17. The passenger conveyor of claim 9, including a controller that controls the indication on the display and wherein the controller automatically sets the indication to correspond to a direction of movement of the steps.

18. The passenger conveyor of claim 17, including a machine that propels the steps in a selected direction and wherein the controller uses information regarding operation of the machine to determine the corresponding indication.

19. The passenger conveyor of claim 18, wherein the controller controls operation of the machine and the display.

20. A passenger conveyor, comprising a landing surface at each of two landings;

a plurality of steps that move along a selected path between the landings;

a handrail that moves with the steps;

a handrail entry module having an opening through which the handrail passes near one of the landings; and a display supported on the landing surface lower than the handrail entry module opening, the display providing a visible indication of a direction of movement of the passenger conveyor.

* * * * *